April 14, 1959 T. J. SULLIVAN 2,881,787
SAFETY CONTROL VALVE
Filed July 13, 1956 3 Sheets-Sheet 1
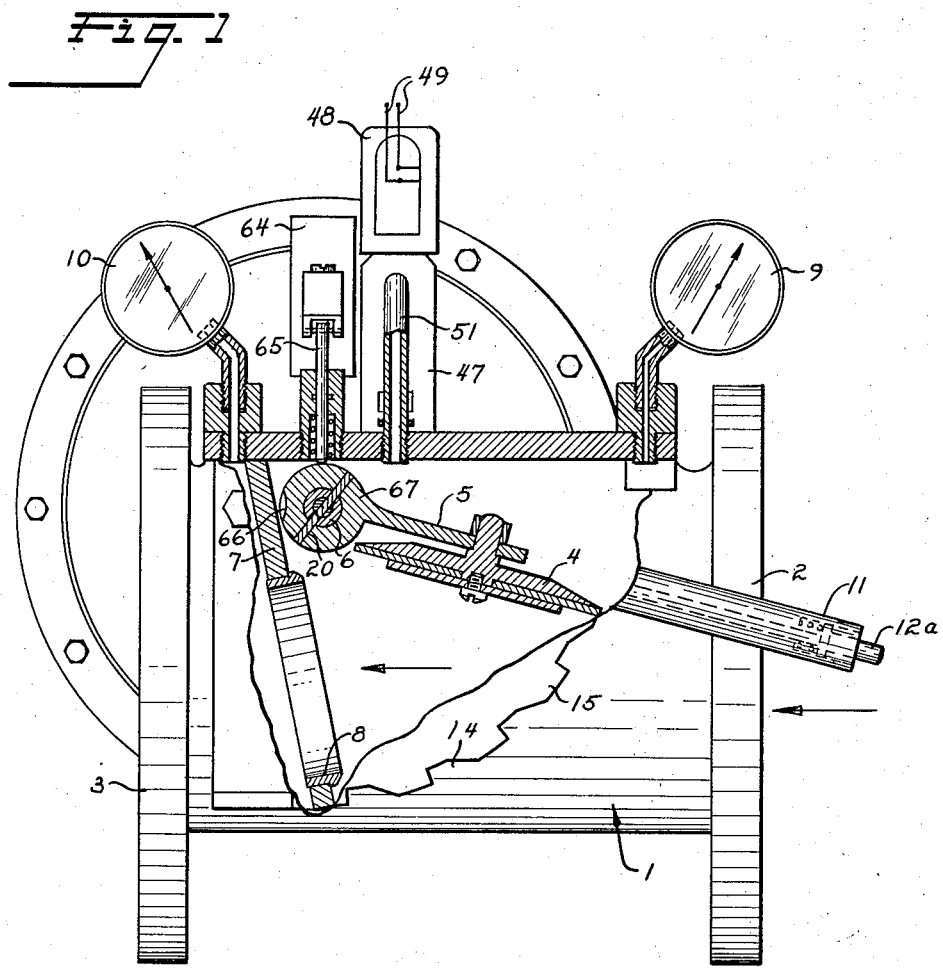
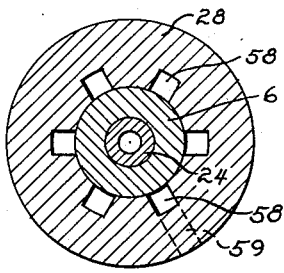
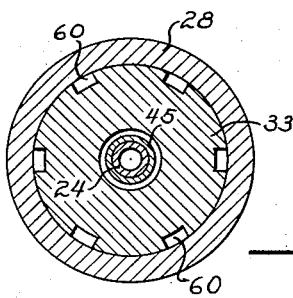
INVENTOR
Timothy J. Sullivan
BY Pierce, Scheffler & Parker
ATTORNEYS

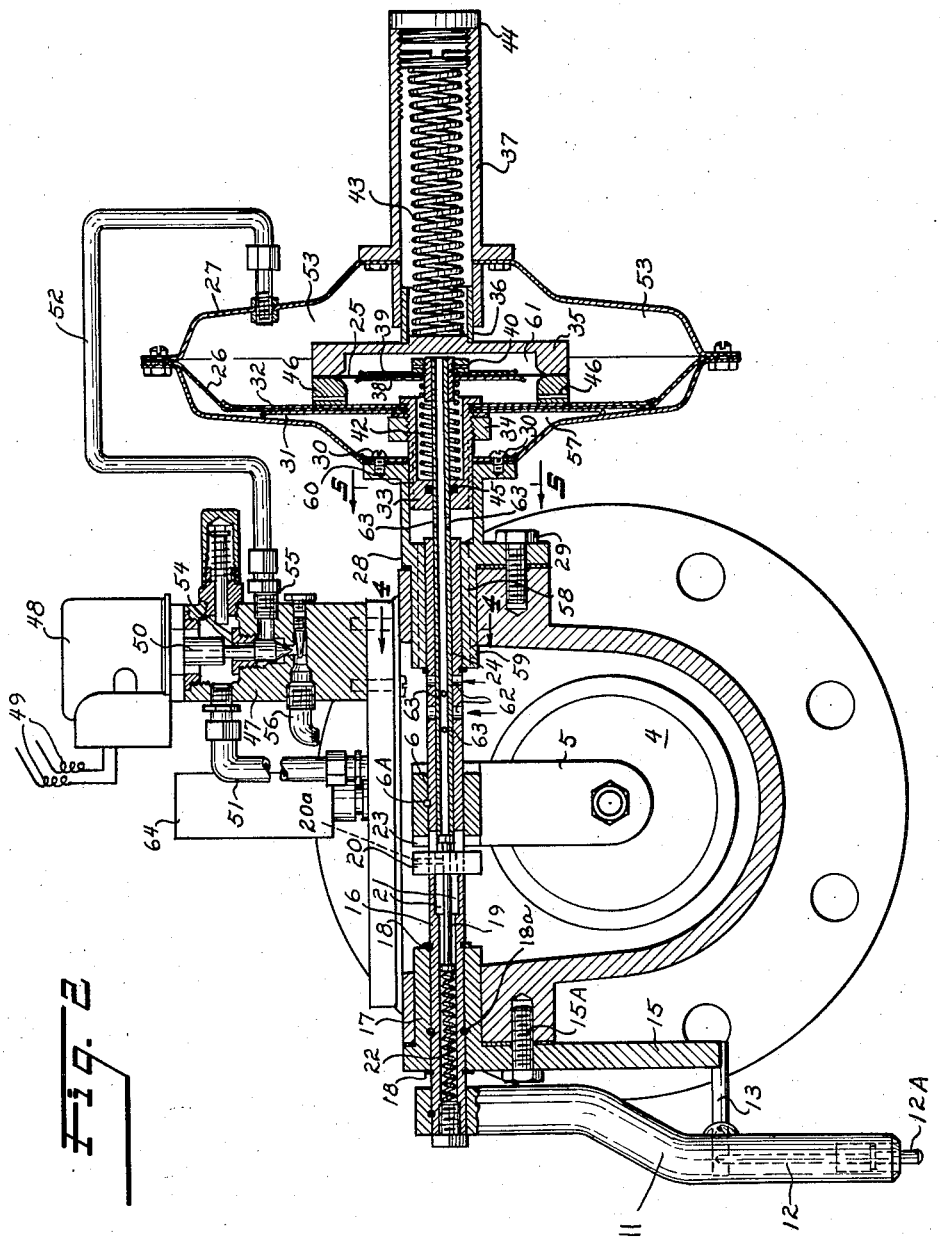

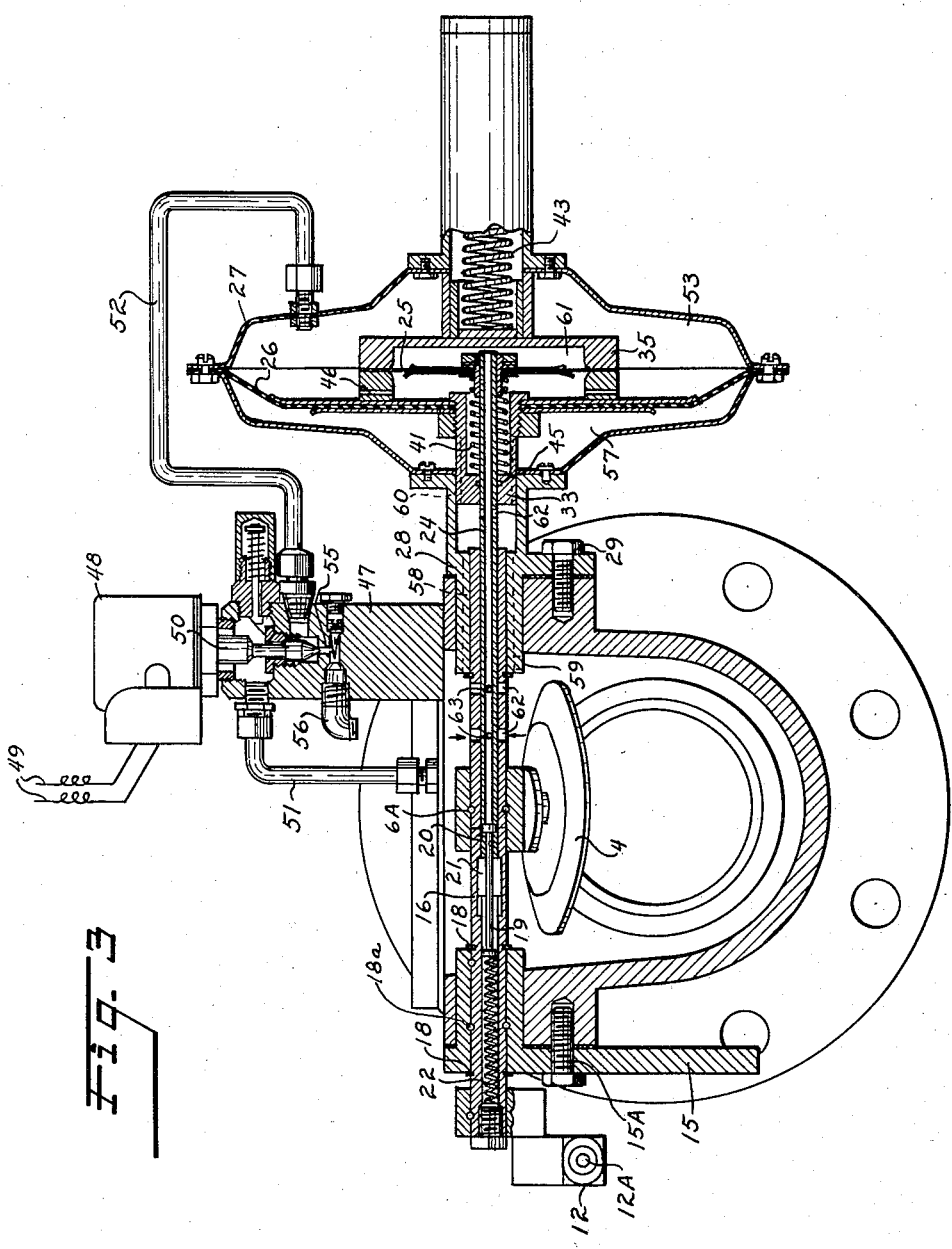

United States Patent Office 2,881,787
Patented Apr. 14, 1959

2,881,787

SAFETY CONTROL VALVE

Timothy J. Sullivan, Butte, Mont., assignor to Sullivan Valve and Engineering Company, Butte, Mont., a corporation of Montana Application July 13, 1956, Serial No. 597,815

6 Claims. (Cl. 137—271)

This invention relates to safety control valves generally, and more particularly to pressure valves which will automatically close upon failure of electrical power or upon deviation of pressure from a preset desired level.

An object of my invention is to provide a pressure responsive diaphragm valve which may be placed in an open position only when electrical power is present and when the supply pressure is at a desired predetermined level.

A further object of my invention is to provide a safety control valve having means for manually setting the valve member to a desired open position and means for automatically disconnecting the connection between the setting means and the valve member upon deviation of supply pressure from a predetermined level or upon failure of electrical power, causing said valve member to close upon its seat.

Other objects and advantages of my invention will become more apparent from a study of the following specification when considered in conjunction with the accompanying drawings, in which:

Fig. 1 is a partially sectional end view of the valve in its open position;

Fig. 2 is a side elevation sectional view of my safety gate valve with the valve in its closed position;

Fig. 3 is a side elevation sectional view of the valve in its open position;

Fig. 4 is a sectional view of the valve stem along line 4—4 of Fig. 2; and

Fig. 5 is a sectional view of the valve stem along line 5—5 of Fig. 2.

Referring to Figs. 1 and 2, the valve body shown generally at 1 has an inlet passage 2 and an outlet passage 3. The valve is of the full-flow type and has a valve body 4 secured to the valve arm 5 which is pivotally mounted within the valve body upon the valve arm supporting shaft 6. Locking pin 6A secures the shaft 6 to the valve arm 5. A transverse wall 7 containing the valve seat 8 divides the interior of the valve body into an inlet and an outlet chamber. When the valve member 4 contacts the valve seat 8, the valve is in its closed position (Fig. 2). Gauge 9 provides means for indicating the inlet fluid pressure and gauge 10 provides means for indicating the outlet fluid pressure.

The valve member 4 is positioned in its open position by means of the lever 11. Lever 11 has suitable linkage means 12 for controlling the cooperation of detent 13 with the teeth 14 of the ratchet section 15. The ratchet section 15 is rigidly secured to the valve body by means of the bolts 15A. As shown in Fig. 2 the lever 11 is secured to hollow actuating shaft 16 which is rotatably mounted within the upper portion 17 of the ratchet section 15. Lock washers 18 prevent longitudinal movement of hollow actuating shaft 16 within the bore of the ratchet section 15, and O-ring 18a serves as a seal about the shaft.

Longitudinally movable within the hollow actuating shaft 16 is the key rod 19 to which is fixedly secured the key 20 by means of a tap screw in the bore 20a. The key rod 19 has ribbed portions 21 which cooperate with grooves in the bore of hollow actuating shaft 16 so that there will be no relative rotational movement between the key rod and the actuating shaft. Compression spring 22 tends to urge the key rod 19 to the right in Fig. 2 so that the key 20 cooperates with key slot 23 in the arm 5. When the key 20 is in the key slot 23, insertion of the button 12a on the lever 11 will cause disengagement of the detent 13 from the ratchet section 15 and counter-clockwise movement of the lever 11 will open the valve as shown in Fig. 1. The degree of opening of the valve member 4 may be determined by the setting of the detent 13 on the teeth 14 of the ratchet section 15.

Abutting the end of key rod 19 adjacent the key 20 is a hollow valve stem 24 which is longitudinally slidable within supporting shaft 6. As will be explained below the longitudinal position of hollow valve stem 24 within supporting shaft 6, and consequently the engagement or disengagement of key 20 with key slot 23, is determined by the position of the high pressure diaphragm 25 and the low pressure diaphragm 26 mounted within pressure motor 27.

Supporting shaft 6 is rigidly secured in supporting sleeve 28 which is bolted to the valve body by suitable bolt means 29. Pressure motor 27 is secured to the supporting sleeve 28 by suitable bolt means 30.

Extending through an opening in the low pressure diaphragm 26 and the pressure plates 31 and 32 mounted on each side thereof is a guide sleeve 33, which is secured to the low pressure diaphragm assembly by means of suitable lock bolt means 34. Guide sleeve 33 is longitudinally slidable within supporting sleeve 28 and positioned therein according to the position of low pressure diaphragm 26 within the pressure motor 27. Rigidly secured to pressure plate 32 is the high pressure diaphragm housing 35 which contains the high pressure diaphragm 25. Cylindrical guide member 36 is secured to the high pressure diaphragm housing 35 and extends into the guide sleeve 37 mounted in the pressure motor casing. Thus the position of guide member 36 within guide sleeve 37 is dependent upon the position of the low pressure diaphragm within the pressure motor 27.

Hollow valve stem 24 extends through guide sleeve 33, through the high pressure diaphragm 25 and the pressure plates 38 and 39 secured on either side thereof, and is secured to the high pressure diaphragm assembly by means of lock bolt means 40. Spring 41 within the spring chamber 42 of guide sleeve 33 cooperates with the high pressure diaphragm assembly and together with main spring 43 and adjusting nut 44 provides means for adjusting the valve operation for any desired pressure required on the line. O-ring 45 provides a pressure seal around hollow valve stem 24.

The operation of the low pressure diaphragm 26 is controlled by means of the three-way solenoid valve 47. When electric power is provided to the solenoid 48 through conductors 49, plunger 50 is drawn upwardly as shown in Fig. 3, and when the electric power supply is terminated, the plunger 50 drops to the position shown in Fig. 2. When the plunger is in the position shown in Fig. 2, pressure line 51 (connected to the interior of the valve body) communicates with pressure line 52 (connected to the low pressure chamber 53 of the pressure motor 27) through passage 54 in the solenoid valve. When the plunger 50 is in the position shown in Fig. 3, pressure line 52 is vented to the atmosphere through passage 55 in the solenoid valve and vent line 56.

The gas pressure within the valve body 1 is communicated to the high pressure chamber 57 of the low pressure diaphragm 26 through channels 58 in the supporting sleeve 28 as shown in Fig. 4 and through channels 60 in guide sleeve 33 as shown in Fig. 5. Passage 59 in the wall of the sleeve 28 serves to provide additional means for entry of the gas into channels 58 from the valve body interior.

The gas pressure within the valve body 1 is communicated to the high pressure chamber 61 of the high pressure diaphragm 25 through openings 62 in the walls of supporting shaft 6, through apertures 63 in the hollow valve stem 24, and finally through the bore of hollow valve stem 24.

Thus the longitudinal position of hollow valve stem 24 within supporting shaft 6 and consequently the engagement or disengagement of the key 20 with the key slot 23 is determined by both the position of the low pressure diaphragm 26 within the pressure motor 27 and the position of the high pressure diaphragm 25 within the high pressure diaphragm housing 35.

The operation of the valve may be described as follows:

When the electrical power is applied to solenoid valve 48 the plunger 50 is drawn upwardly as shown in Fig. 3 and the low pressure chamber 53 of the low pressure diaphragm 26 is vented to atmosphere through line 52, passage 55, and vent pipe 56. As the pressure in valve body 1 begins to build up, an increase of pressure is communicated to the high pressure chamber 57 of the low pressure diaphragm 26 through passages 58 of the supporting sleeve 28, and passages 60 of the guide sleeve 33. Low pressure diaphragm is then moved to the right as shown in Fig. 3, compressing spring 43. Hollow valve stem 24 moves to the right in Fig. 3 and spring 22 urges key rod 19 to the right causing engagement of the key in the key slot 23. Consequently upon release of the detent 13 with the ratchet teeth 14, the lever 11 may be rotated in a counterclockwise direction, raising the valve member 4 to the position shown in Figs. 1 and 3. Detent 13 may be engaged with teeth 14 to hold the valve in the desired open position.

Now if the supply pressure should decrease beyond a desired minimum value, the low pressure diaphragm will move to the left in view of the pressure exerted by spring 43; hollow valve stem 24 will thus be moved to the left, key rod 19 will be moved to the left and key 20 will be withdrawn from the key slot 23. Valve member 4 will then drop due to gravity to seat against the seat 8 to close the valve.

Similarly, if the supply pressure should exceed the desired level, the pressure would be transmitted to the high pressure chamber 61 of the high pressure diaphragm 25 through the hollow valve stem 24, high pressure diaphragm 25 would move to the left against the pressure of spring 41, hollow valve stem 24 and key rod 19 would be moved to the left causing disengagement of key 20 from key slot 23, and consequently the valve 4 would drop by gravity to close upon seat 8.

Should the electrical power supply fail when the valve is in the open position of Fig. 3, the solenoid valve plunger would drop closing passage 55 and connecting lines 51 and 52. Thus, the pressure on both sides of the low pressure diaphragm 26 would be equalized, spring 43 would cause the low pressure diaphragm to move to the left, key 20 would be removed from the key slot 23 and valve member 4 would close upon its seat 8.

Thus it is apparent that the valve in its open position is responsive to low and high supply pressure and will automatically close upon variations thereof from a predetermined set level. Similarly the valve will automatically close upon failure of the electrical power supply.

The valve may be provided with a switch 64 having a plunger 65 adapted to cooperate with a groove 66 in the mounting portion 67 of the valve arm 5. The switch may be wired to the main firing valve so that when the valve member 4 drops, the mounting portion 67 rotates clockwise as shown in Fig. 1, and plunger 65 may drop into recess 66 to break the contacts of switch 64 and thus open the main firing valve.

Referring to Figs. 2 and 3, the pressure valve may be assembled to constitute either a right-hand or a left-hand arrangement as desired. By removing bolt 15A the ratchet section 15 and the actuating shaft 16 may be removed from the valve body. Upon removal of the pin 6A from the valve arm supporting shaft 6 and upon removal of the bolt 29, the pressure motor assembly, the supporting shaft 6 and the hollow valve stem 24 may be removed from the valve. The pressure motor assembly and the ratchet section and lever arm assembly may be interchanged and bolted to the valve body. Pin 6A may then be reinserted to connect the shaft 6 to the valve arm 5.

While in accordance with the provisions of the statutes I have illustrated and described the best form of embodiment of my invention known to me, it will be apparent to those skilled in the art that changes may be made in the form of the apparatus described without departing from the spirit of my invention as set forth in the appended claims.

I claim:

1. In a safety control valve for pressure gas lines having a valve casing divided into an inlet chamber and an outlet chamber by a transverse wall provided with a valve seat, a valve arm pivotally mounted within said casing, and a valve member secured to said arm and adapted to be seated upon said valve seat to close the passage through said valve casing; the invention comprising detent means for maintaining said valve member in an open position, said detent means including an actuating shaft rotatably mounted in the wall of the casing colinearly with the pivot axis of said valve arm, said valve arm having a key slot at the pivotal axis thereof, a key element longitudinally slidably and non-rotatably connected to said actuating shaft, spring means normally urging said key element into engagement with said valve arm key slot, and means external of said casing for rotating said actuating shaft to pivotally raise said arm and the valve member thereon from said valve seat; and means responsive to the gas pressure in said casing for moving said key element longitudinally with respect to said actuating shaft to displace said key element from said key slot whereby said valve arm will be caused by gravity to pivot downwardly to seat said valve member upon said valve seat.

2. A safety control valve as defined in claim 1 wherein said gas pressure responsive means are secured to said casing opposite said detent means, and said gas pressure responsive means and said detent means are interchangeable on said valve casing.

3. A safety control valve as defined in claim 1 wherein said valve arm is secured to a hollow supporting shaft rotatably mounted in the casing opposite said actuating shaft and arranged colinearly therewith, and wherein said pressure responsive means includes a valve stem slidably movable in said supporting shaft and adapted to co-operate at one end with said key element to displace the same from said key slot to release said valve arm.

4. A safety control valve as defined in claim 3 wherein said pressure responsive means includes a pressure motor housing having a low pressure diaphragm therein, a high-pressure diaphragm housing secured to said low pressure diaphragm and having a high pressure diaphragm therein, the other end of said valve stem being secured to said high pressure diaphragm, means providing communication between said casing and said motor housing to cause said low pressure diaphragm to be moved in a direction to withdraw said valve stem from engagement with said key element to permit engagement of said element with the key slot when the pressure in the valve casing exceeds a predetermined minimum value, and means providing communication between said casing and said high-pressure diaphragm housing to cause said high pressure diaphragm to be moved in a direction to disengage said key element from the key slot when the pressure in the valve casing exceeds a predetermined desired maximum value.

5. A safety control valve as defined in claim 4 and further including electric solenoid valve means for causing said lower pressure diaphragm to move in a direction to displace said key element from the key slot when the power through an associated electrical circuit is discontinued.

6. A safety control valve as defined in claim 1 wherein said external means for rotating said actuating shaft includes an operating arm secured to said actuating shaft externally of said valve casing, and ratchet means associated with said operating arm for adjustably setting the same with respect to said casing to adjust the position of said valve arm with respect to said valve seat.

References Cited in the file of this patent
UNITED STATES PATENTS

| | | |
|---|---|---|
| 1,055,803 | Runnion | Mar. 11, 1913 |
| 2,327,055 | McMahon | Aug. 17, 1943 |